United States Patent [19]

Dallaserra

[11] 4,455,809

[45] Jun. 26, 1984

[54] PROCESS AND APPARATUS FOR MANUFACTURING CONTINUOUS SEALED POSTAL OR OTHER ENVELOPE ASSEMBLIES

[75] Inventor: Arthur B. Dallaserra, Aulnay sur Bois, France

[73] Assignee: Iseto Shiko Co., Ltd., Osaka, Japan

[21] Appl. No.: 204,815

[22] Filed: Nov. 7, 1980

[51] Int. Cl.$^3$ .............................................. A21C 15/04

[52] U.S. Cl. ........................................ 53/435; 53/450; 53/460; 53/493; 53/520; 53/555; 53/569

[58] Field of Search ................. 53/435, 450, 460, 520, 53/555, 493, 569, 553, 206; 493/216, 921, 224, 239; 225/106, 100, 4, 5; 178/461, 460, 624, 577; 229/69; 271/270

[56] References Cited

U.S. PATENT DOCUMENTS

| | | | |
|---|---|---|---|
| 2,252,733 | 8/1941 | Sherman et al. | 225/4 |
| 2,778,424 | 1/1957 | Hageman et al. | 225/106 X |
| 3,051,103 | 8/1962 | Williams | 493/224 X |
| 3,140,572 | 7/1964 | Petersen et al. | 53/520 X |
| 3,332,324 | 7/1967 | Lemacher et al. | 493/197 |
| 3,558,041 | 1/1971 | Buescher | 229/69 X |
| 3,827,545 | 8/1974 | Buhayar | 198/461 |
| 3,830,141 | 8/1974 | Steidinger | 53/450 |
| 3,847,318 | 11/1974 | Parenti et al. | 225/4 X |
| 3,888,399 | 6/1975 | Hanson et al. | 225/106 |
| 3,942,694 | 3/1976 | Jones et al. | 225/100 |
| 4,025,023 | 5/1977 | Moffitt | 225/100 |
| 4,095,695 | 6/1978 | Steidinger | 206/610 |
| 4,261,497 | 4/1981 | Roetter et al. | 225/106 |

FOREIGN PATENT DOCUMENTS 7532967 5/1976 France .

*Primary Examiner*—Nicholas P. Godici

*Assistant Examiner*—M. Jordan

*Attorney, Agent, or Firm*—Sandler & Greenblum

[57] ABSTRACT

A process and apparatus for forming a continuous assembly of sealed envelopes having upper and lower sections and comprising at least one insert of the type used as a postal mailer or the like. The process comprises providing continuous upper and lower sheets each comprising transverse weakening lines defining discrete upper and lower sections adapted to be separated along each of the lines, consecutive weakening lines being separated by a substantially constant spacing E1; providing a continuous intermediate sheet comprising transverse weakening lines defining intermediate discrete sheet sections having a width less than the width of the upper and lower sections, consecutive weakening lines being spaced by a substantially constant spacing E2, E2 being less than E1; passing the upper and lower continuous sheets along discrete paths and through drive rollers at the inlet of a sealing station at a velocity V1 equal to the tangential velocity of the drive rollers and passing the continuous intermediate sheet along a path and towards the drive rollers at a velocity velocity V2 less than V1 wherein V2/V1 substantially equals E2/E1. The continuous intermediate sheet is separated to form discrete intermediate sheet sections along each of the weakening lines of the continuous intermediate sheet during passage through a separation station positioned ahead of the drive rollers whereby each of the intermediate sheet sections is positioned between the upper and lower continuous sheets to form the continuous assembly as it enters the drive rollers. The assembly is subsequently sealed.

18 Claims, 2 Drawing Figures

V1
V2
E1
E2
10
10a
10b
11
11a
11b
12
12a
12b
13
14
15
16
17
18
19
20
21
22
23
24
25
26
27

PROCESS AND APPARATUS FOR MANUFACTURING CONTINUOUS SEALED POSTAL OR OTHER ENVELOPE ASSEMBLIES

BACKGROUND OF THE INVENTION

1. Field of the Invention

The Invention relates to a process and apparatus for forming mailers as continuous strips for use in correspondence or in the distribution of confidential information (salary forms for example).

2. Description of Prior Art

Generally, such strips comprise bundles of continuous sheets, folded in accordeon or zig zag fashion of which each flat surface constitutes an individual "mailer". These "mailers" allow for printing on a printer such as a computer printer, with an electronically readable or other material. The lower sheet of the bundle or sheet is adapted to form for each of the flat surfaces, i.e., for each of the unitary mailers, the backing of the mailer, while the upper sheet forms the face of the mailer. All of the intermediate sheets are adapted to constitute the interior documents or inserts of each of the mailers. In known assemblies (carbon papers, chemically treated papers, or self reproduction sheets which may be zoned, etc.) the strike of the printer is registered selectively on certain of the sheets, thus on certain of the interior documents, while non-personalized references, i.e., references which are identical for all of the mailers, are printed on one or several sheets before their assembly. Very often the bundle further comprises a cover band or strip known as an archive or verification strip, which covers the upper sheet. Originally, this band was principally adapted to register all of the information printed by the printer so as to allow for possible ultimate verification (thus the designation "verification" band). However, modern computer memory capacity renders this function unnecessary and the verification band serves only to "retain" the information which is not to appear on the upper sheet, i.e., most often all of the information besides the addresses of the addressee which are printed on the upper sheet by virtue of carbon sheets carefully positioned on the opposite side of the verification band.

At least the lower and upper sheets are joined by adhesive along the length of their lateral edges. Furthermore, each of the sides of the mailer is sealed at the top and bottom by transverse adhesive streams connecting the upper and lower sheets to one another across the transverse cutaways provided along all of the intermediate sheets.

Perforated detachment lines and/or tear tabs allow for the opening of the mailers by the addressees and the removal of the interior documents.

Finally, on each of its lateral sides, the bundle is provided with feeder perforations positioned in a marginal detachable zone. These perforations allow for the movement of the bundle in and through the printer and subsequently into the separation device.

After passage through the printer the bundle is brought to a separation device where, after removal of the cover strip, if one is used, the mailers are separated from one another along the zig zag fold lines either by rupture by exertion of traction or by cutting with a paper cutter or the like. Often, at the inlet of the separation device, serrated wheels longitudinally detach the marginal zones comprising the feeder perforations. However, such an arrangement is not absolutely necessary since the separation of these zones can be performed on each mailer by the addressee if longitudinal lines of detachable performations have been provided.

Numerous types of such individual mailer assemblies are known. These assemblies differ in some cases by the disposition of the interior documents. However, most often these assemblies differ in the disposition of the perforated detachment lines and of the tear tabs in a manner so as to allow for simplification of the technique used to open the mailer and to remove the inserts.

Such assemblies are being utilized more and more frequently for the distribution of confidential personalized information or for mass mailings such as advertising, late notices, bills, statements of account, payments, etc. However, all such assemblies suffer from certain disadvantages:

(a) Since each of the inserts is not in the position of the original, they cannot be used with magnetic or optical readers which makes the use of such articles impossible in particular with respect to the mailing of drafts and the like.

(b) As was noted above, a cover strip must be provided when certain data printed by the printer is not to be reproduced on the face of the envelope but is to appear on the inserts, which is most often the case. In such cases, this band is useless and is, therefore, disposed of almost immediately.

(c) In order to allow for clear reading of printer print on the interior documents and especially on the last document, it is necessary to use as the top sheet (face of the envelope) a low weight paper which is incompatible with certain situations, e.g., with mailers which are to be sorted by the post office.

(d) The transverse cutting of the intermediate sheets require costly additional steps requiring a special and costly tool.

(e) The cutaways cause a localized excess thickness in the corners due to the intermediate or insert sheets which results in the formation, during folding, of elevated areas and thus the risk of accident and of damage during passage through the printer.

In order to overcome the disadvantages set forth in subparagraphs (d) and (e), it has been proposed to make the interior documents (or inserts), not out of continuous intermediate sheets appropriately cut apart, but out of sections having dimensions smaller than those of a single mailer and adhesively secured on the continuous band formed by the lower sheet (U.S. patent application Ser. No. 720,398 now U.S. Pat. No. 4,239,114 and U.S. Pat. No. 4,095,695). These assemblies are nevertheless difficult to manufacture. In some cases, such difficulties occur by virtue of the stepwise progression through the assembly machine and always results in a noticeable slowdown of the production line.

In order to overcome the disadvantages of paragraphs (a), (b) and (c) it has been proposed to provide for the sealing of the individual mailers by the user, after the passage through the printer, which allows for the direct printing of at least one interior document and the obviation of the verificiation strip, either with a bundle of continuous sheets with conventional transverse cutaways (U.S. application Ser. No. 837,339 now abandoned), or according to certain of the embodiments disclosed in application Ser. No. 720,398 referred to above.

SUMMARY OF THE INVENTION

It is an object of the invention to overcome the above inconveniences and disadvantages.

The process according to the invention makes it possible to obtain a continuous assembly of mailers with inner documents unsecured to the outer sides of the mailer out of continuous sheets which are not transversely cut away. This totally overcomes disadvantages (d) and (e). This process can be performed with simple means by the user, therefore, after the passage of at least one of the continuous sheets through the printer, if desired, which makes it possible to overcome inconveniences (a), (b) and (c).

The invention provides a process of manufacture comprising in a conventional fashion, the integralization or joinder of a continuous lower sheet and of a continuous upper sheet by sealing along their longitudinal edges and along the transverse strips lying across the aligned weakening lines, of constant spacing E1, the assembly being adapted to be separated into individual mailers. The sealing is achieved, in particularly, by pressure in a station comprising at its inlet at least one pair of drive rollers between which the two sheets are brought towards the inlet and are engaged at the same velocity of passage V1; V1 being equal to the tangential velocity of the drive rollers along distinct paths. The invention is notable in that it comprises guiding and driving towards the drive rollers of the sealing station, at a velocity V2 less than V1, and along respective paths, at least one intermediate sheet of a width less than that of the lower and upper sheets and provided with weakening or tear lines having a constant spacing E2 less than E1, all in a manner such that V2/V1 equals E2/E1. The invention further comprises separating the intermediate sheet along each of its weakening or tear lines at the point of their passage into a separating station situated ahead of the sealing station, and, finally, successively bringing, at an average velocity substantially equal to V1, each of the intermediate sheet sections thus formed, to be taken up by the drive rollers at the inlet of the sealing station between the upper and lower sheets referred to above.

It is clear that the separation of each intermediate sheet can be performed in various fashions, e.g., by rotatary cutting knives, by rupturing after incision with sudden but very brief acceleration, or even by classical rupture obtained by a brisk acceleration of movement causing breakage at the tear lines.

The invention does not relate to the method of insertion of the sheet or sheets adapted to form the interior documents and prior to assembly each sheet may be subjected to various treatments or working steps.

Most frequently, the diverse sheets are guided and moved along their respective paths by pin feeders cooperating with marginal perforations of the sheets. When the interior documents need not ultimately comprise such perforations, one can use a conventional edge cutter device along the path of the intermediate sheet upstream of the separation station.

The sealing station can comprise various means. The integralization or sealing of the lower and upper sheets over the periphery of each of their sides can result from a simple stamping, crimp locking, stapling or stitching. The sealing can further be achieved by fusion with or without the addition of material. However, most often, sealing is performed by gluing, either by simply gluing, streams of glue being deposited over at least one of the upper and lower sheets, or by self-adhesion in which streams of self-bonding substance is deposited on each of the upper and lower sheets. Alternatively, the sides can be thermally bonded after application of streams of heat setting glue which are activated by heat on at least one of the sheets. In the case of simple or self-adhesion, the device will comprise, downstream of the drive rollers, at least one pair of pressure rollers and, in the case where the sheets are thermobonded, at least one of the pairs of pressure rollers is a heating roller. When the interior document(s) are thin, the pressure rollers, which may be heated, can be cylindrical and smooth. However, when the total thickness of the interior documents becomes substantial, it is advantageous to provide rollers having hollowed-out depressions; the form of each depression corresponding to the interior of the sealing frame of a single mailer.

The invention further has as an object a device for carrying out the inventive process, comprising a distinct path for each sheet along which it is guided and driven by pin feeders or the like cooperating with perforations provided along the sheet's longitudinal edges. The path ends in a pair of drive rollers, rolling against one another, which constitutes the inlet of a pressure sealing station. The device is notable in that the pin feeders of the circuit of each intermediate sheet rotate more slowly than those along the paths of the lower and upper sheets. The spacing of the tear or weakening lines provided on each of the sheets is directly proportional to the velocity of passage of the sheet being considered. Along the path of each intermediate sheet is positioned, upstream of the sealing station, an edge cutting device for the elimination of perforated drive margins. A device for separating along the tear lines is then provided and the successive intermediate sheet sections thus formed are brought to the inlets of the drive rollers of the sealing station where they are introduced between the rollers and between the upper and lower sheets. This is assured by carrier means such that the average velocity between the instant of rupture and that of the entrance to the sealing station is substantially equal to the velocity of passage V1 of the lower and upper sheets referred to above.

For producing a conventional "mailer" delivered to the user in the form of a continuous assembly of sealed mailers, the device according to the invention is positioned between the outlet of a conventional forming machine comprising all or some of the printing, perforation, cutting, coating (with sealing means) stations and the inlet of a zig zag station. However, this device can also be used by the user or customer. In this instance, the inventive device is positioned upstream of a device which separates the assembly into discrete mailers, a rupturer for example, and each of its circuits is thus fed by an appropriate continuous sheet, folded in a zig zag fashion after passage of at least one of the intermediate sheets through a mechanographic printer. The upper sheet preferably comprises a rectangular cut away with respect to the identification location of the addressee so as to avoid any necessity of identification.

BRIEF DESCRIPTION OF THE DRAWINGS

The invention will be better understood with reference to the description which follows taken in conjunction with the annexed drawings in which.

DESCRIPTION OF PREFERRED EMBODIMENTS

In the two Figures, similar elements or elements serving the same function or acting in the same way are identified by numerals differing by 100.

Figure 1:
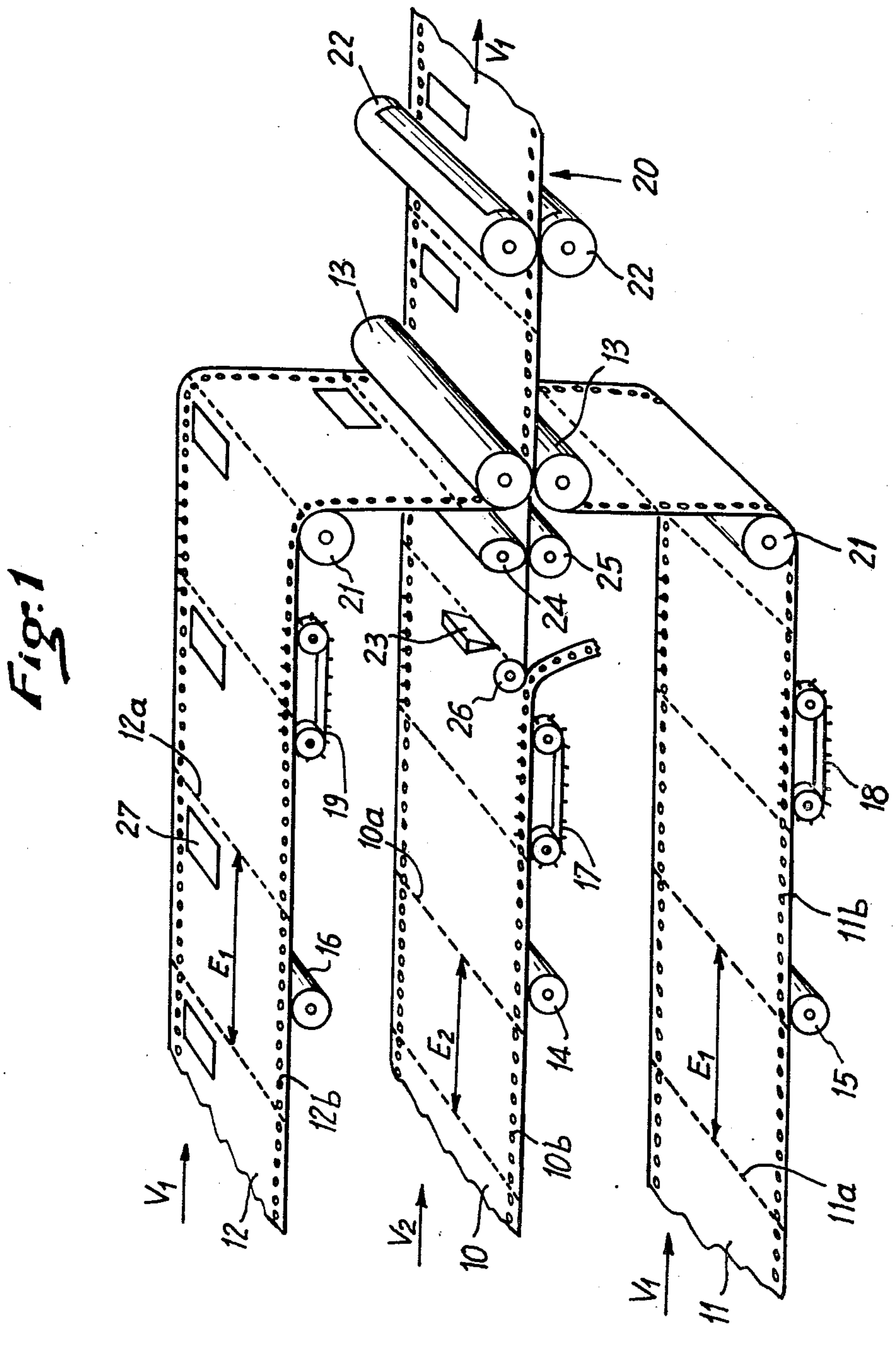
FIG. 1 is a schematic representation of the terminal portion of an assembly device of continuous sheets according to the invention.

In FIG. 1, the assembly comprises three continuous sheets, i.e., a lower sheet 11, an upper sheet 12 and an intermediate sheet 10. Each of these sheets comprises marginal perforations **10*b*, 11*b* and 12*b* along at least one of its longitudinal edges, and is guided and transported along a respective path, schematically represented by support rollers 14, 15 and 16, and by pin feeders 17, 18 and 19. Each sheet comprises transverse weakening or tear lines 10*a*, 11*a* and 12*a* equidistantly spaced along each sheet with two successive lines defining a discrete sheet section corresponding to a single mailer. On the lower sheet 11 and upper sheet 12, the spacing E1 of the tear lines is greater than that of E2 defined by the tear lines 10*a* of the intermediate sheet 10. At least one of the lower and upper sheets 11 and 12 comprises sealing means along the length of its longitudinal edges (interiorly of the perforated drive margins) and sealing means extending over the transverse tear lines 11*a* and/or 12*a*. These sealing means are activateable by pressure or by heat and pressure. Assembly is performed in a sealing station 20 whose inlet is constituted by a pair of drive rollers 13 rolling on one another, and between which diverse sheets are ultimately engaged after passage over two direction deflecting rollers 21. In the sealing station, the upper and lower sheets are united, over the entire periphery of each of their sides by virtue of pressure cylinders 22 which may be heated (in the situation where the sealing means are constituted by strips of thermo-bonding glue). As has been said, the pressure cylinders 22** can be hollowed out with depressions when the thickness of the interior documents of each of the mailers necessitates it.

To arrange an interior document in each of the mailers so that it is free to move therein and is not secured to the outer sheets, i.e., to introduce a sheet section between the upper and lower sheets, without the section being "held" held by the seal, but, on the contrary, remaining free in the interior of the sealed mailer so as not to interfere with its removal by the addressee, the following measures are taken.

The intermediate sheet 10 is slightly narrower than the sheets 11 and 12. As has been noted, the length or spacing E2 of the sides of the sheet 10 is less than the length or spacing E1 of the sides of sheets 11 and 12. The difference of width and height of the sides of the strip 10 with respect to those of the strips 11 and 12 is at least equal to twice the width of a sealing stream such that the interior document can be positioned entirely on the interior of the sealing frame without being held by the seal. It suffices, therefore, that the upper edge of a side of sheet 10 be engaged between the drive rollers 13 slightly later than the upper edges of the sides of sheets 11 and 12 and that the intermediate sheet be detached from the continuous strip 10 so as to appropriately lodge itself between the sheets 11 and 12. For this to occur, the rollers 13 have a tangential velocity equal to the velocity of passage V1 of sheets 11 and 12, while the velocity of passage V2 of the sheet 10 imposed by drive means such as 17 is such that V2 is less than V1 and such that V2/V1 equals E2/E1. Furthermore, when the forward or upper edge of each side of sheet 10 is gripped by the rollers 13, the sheet 10 is subjected to a sudden acceleration by acceleration means which causes the sheet to rip along tear line **10*a* which is closest and free of the pins. So as to facilitate this ripping, it is advantageous to provide a tear tab by incision of this line 10*a*, in a known fashion, by means of a knife 23 placed ahead of the rollers 13 and at a distance from the latter which is at least equal to E2 such that the incision occurs before the beginning of the acceleration but less than twice the length E2 such that at the moment of acceleration, only a single line 10*a*** is affected.

The ripping occurs at the moment of the acceleration and a temporary ripple forms immediately downstream of the acceleration means without modification of the movement with respect to the velocity V2 upstream, as well as with respect to the velocity V1 downstream. The instantaneous accelerator means can, for example, comprise a pair of rollers 24 and 25 of which at least 24 is motorized and has an elliptical cross section and whose tangential velocity at the end of its major axis is, for example, equal to a velocity which is twice V2.

If marginal perforations are not desired on the interior document, an edge cutter 26 can be provided upstream of the knife 23.

When referring to the intermediate "sheet" 10, this term is taken to include a continuous assembly of which each section is to be positioned on the interior of a respective individual mailer. However, this "sheet" can be of several thicknesses, either by virtue of the fact that it itself is a thin bundle of several continuous piles or by virtue of the fact that it results from the longitudinal folding of a wide strip. In this latter case, a folding guide (not shown) is arranged at the inlet of the sheet circuit 10.

Figure 2:
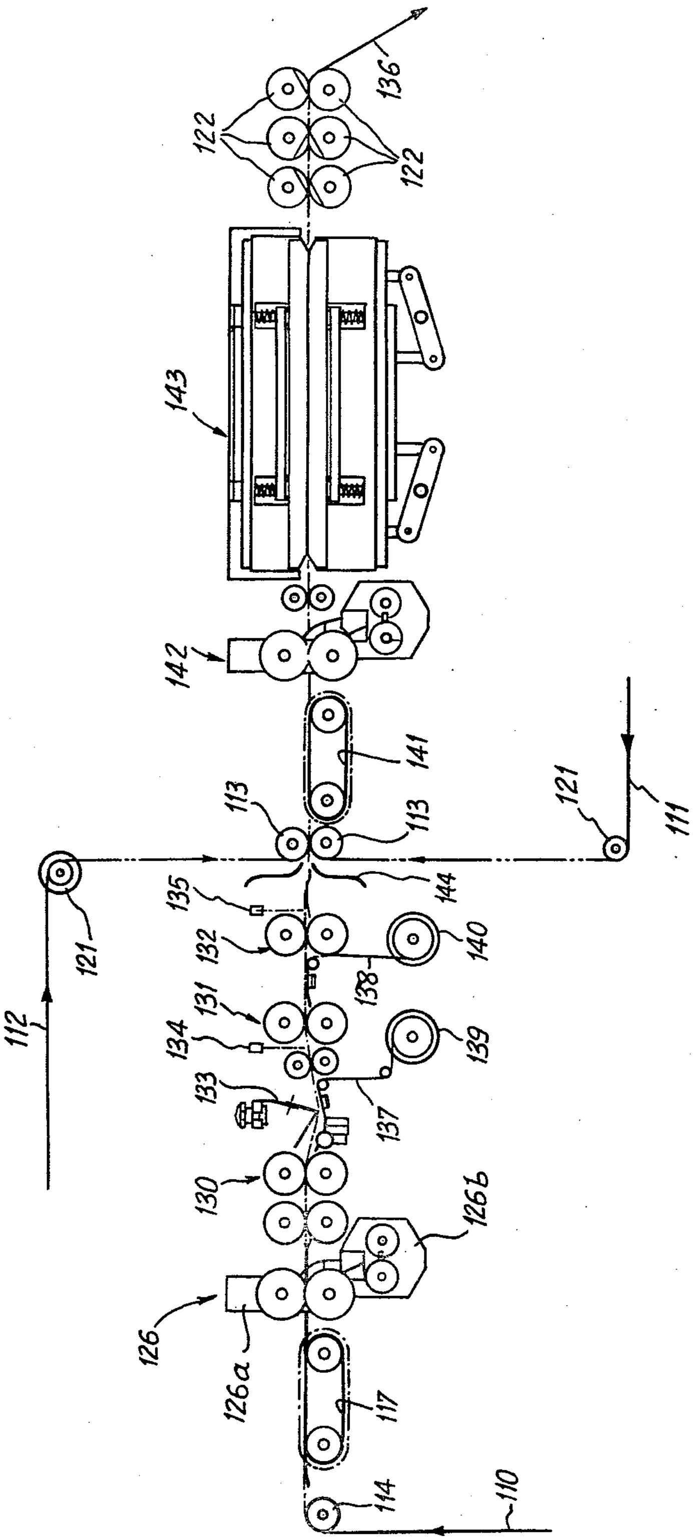
FIG. 2 is an alternative embodiment of the device with modification of the separation station as well as the sealing station.

In FIG. 2, an assembly 136 of three sheets is again shown, i.e., a lower sheet 111, an upper sheet 112 and an intermediate sheet 110. Each of these sheets follows a distinct path bringing it, ultimately, after passage over direction affecting rollers 121, to the inlet 144 of a sealing station where it is grasped between two drive rollers 113. In the example shown, the sides of at least one of the lower sheet 111 and upper sheet 112, each comprise a peripheral frame for coating thermofusable material thereon and the sealing station is a thermofusion station with an oven 143 and press rollers 122 having hollowed depressions as has been described above.

Along their respective paths, the sheets 111 and 112 move at the same velocity V1 caused by pin feeders (not shown) which cooperate with marginal perforations of the sheets. The drive rollers 113 have a tangential velocity equal to V1 and the assembly of the two sheets 111 and 112 squeeze the intermediate sheets such as 110 is grasped immediately downstream of the rollers 113, by pin feeders 141 rotating at velocity V1. The pressure rollers 122 rotate at this same velocity which is the velocity of passage of the assembly 136 to the outlet of the sealing station. With the exception of those instances where the assembly 136 must ultimately pass into treatment machines comprising pin feeders, the marginal superimposed perforations of the sheets 111 and 112 become useless as of the beginning of the assembly process and in the example given, an edge cutter device 142 is provided which is similar to the device 126 placed along the path of the intermediate sheet 110 and which will be described in detail below.

As was previously the case, the sheet 110 is narrower than the sheets 111 and 112 which are themselves of the same width so as to be able to register exactly. Each sheet has equidistant transverse tear or weakening lines. The spacing of these lines is E1 on the sheets 111 and 112 and E2 is less than E1 on the sheet 110. Finally, the sheet 110 passes at a velocity V2 caused by pin feeders 117, such that V2/V1 equals E2/E1.

As in the preceding embodiment, the invention resides in the method of insertion of the intermediate sheet 110 or, more precisely, the sections resulting from the splitting of the sheet 110 along its transverse tear lines. After pin feeder 117, the sheet 110 passes into an edge cutter 126 which is on one or both sides of the sheet depending upon whether the sheet has marginal drive perforations along a single edge (for example, a wide sheet folded longitudinally at the inlet of its respective path) or along two of its longitudinal edges. The edge cutter 126 comprises, in a known fashion, a serrated wheel 126*a* to cut in a continuous fashion the corresponding marginal zone and a rotatable sectioner 126*b* to reduce the continuous strip detached by the serrated wheels 126*a* into short segments. Downstream of the edge cutter 126, the sheet 110 passes in a "splitter" or rupturer constituted essentially, in a conventional fashion, on the one hand, by two pairs of wheels, i.e., a first pair 130 whose tangential velocity is substantially equal to V2 and a second pair of rollers 131 whose tangential velocity V3 is substantially equal to twice V2 and, on the other hand, by an angled or corner tearing element 133 positioned between the two pairs of rollers referred to above and adapted to be lowered during the passage of each weakened line in a manner so as to "penetrate" it over at least a portion of its length. Rollers 131 are positioned at a distance E2 ahead of drive roller 113 while after the rupture, each section of sheet 110 is picked up by the reduction rollers 132 whose velocity is adjusted automatically by the signals emitted by a position indicator 135 in a manner such that the spacing between two successive sheet sections is constant and equal to E1−E2, which means that the reduction rollers 132 bring the average velocity at the rupture point and the inlet 144 of the sealing station to a value substantially equal to V1.

It is advantageous to provide, over the path of the sheet sections, at least one presence and/or jamming indicator 134.

Of course, in the two embodiments, whether it be the embodiment of FIG. 1, with instantaneous sudden acceleration over the upstream portion of a side whose front end is driven at the velocity V1 or that of FIG. 2, with acceleration and then slowing down of each section and adjustment of its relative position with respect to the preceding section; each section must be grasped by a downstream drive means no later than the instant when it escapes from an upstream drive means, i.e., it must be possible to adjust the spacing of the different stations (26, 23, 24, 13 and 126, 133, 131, 132, 113) as a function of the format E2 of the sides of the sheet 10 or 110. For this to occur, the various stations can be made to slide on rollers provided on the machine and can be locked into relative position. The slide paths of continuous sheet 10 or 110 and then of the sections of this sheet are constituted by conveyors being able to unwind from recoiling rollers as has been shown by way of example, in FIG. 2, with the slide conveyors 137 and 138 and their respective rollers 139 and 140.

Within the framework of the production of a conventional "mailer" the device of FIG. 1 or of FIG. 2 is incorporated into the assembly line and constitutes a portion of the fashioning machine. Each sheet is rolled off of a respective bobin and passes through various conventional stations for printing, perforation, cutting, and application of adhesives or other coatings, so to arrive at the terminal position shown. However, of course, the passage of the intermediate sheets must be slower than that of the upper and lower sheets from one end to the other of the operation. Downstream of the sealing station, the fashioning is completed in a zig zag folding station, after being joined in some cases by lateral stamping to a cover strip.

The process of insertion of interior documents with the device described hereinabove lends itself particularly to being carried out by the user, which makes it possible to solve many problems. As used herein the term "user" is taken to mean the consumer who will use the mailer for a given purpose by mailing it to an addressee. In effect, it suffices for the user to feed the device beginning with the "zig zags" of the diverse sheets; the sheets 11 and 12 (or 111 and 112) being furnished to it, ultimately with diverse printing, ready to be used and the sheets 10 (or 110) having been preliminarily filled in by its mechanographic printer (in simple typing, or into a Y with longitudinal folding). Thus, at least one, but possibly all of the interior documents can be typed upon directly thus allowing for optical or magnetic reading of these sheets. For the customer to operate in this fashion, one avoids sealing with ordinary adhesive or glue (necessitating a gluing station in the device) and one would provide a thermobonding station for the activation of thermosetting streams or strips of adhesive on the sheet 11 and/or the sheet 12 (or 111 or 112). Downstream of the sealing station, the assembly is brought directly or indirectly towards a mailer separation station (as distinguished from the separator for the intermediate sheet) and even a postage station if desired. So as to avoid any necessity of identification, the upper sheet 12 (or 112) is provided with windows 27 corresponding to the location wherein the addressee is identified on the sheet 10 (or 110). To eliminate possible damage, it is desirable to provide sensing means such as presence indicators for the various sheets (feelers or photoelectric cells) at various points of the circuit.

In the most common case where windows 27 are provided and where the sheet 10 (or 110) is single ply, with possible longitudinal folding, it should be noted that not only are the one or two interior documents typed upon directly, with all of the advantages which result therefrom (neatness, ability to be read optically or magnetically) but, furthermore, there is no need for the printing to be transferred from one element to the sheet assembly to the other. Thus, all of the sheets may be made out of ordinary paper which results in a substantial savings with respect to similar articles presently known.

The invention is in no way limited to the embodiments described and shown. It should be noted that the invention relates only to the mode of insertion of the interior document or documents irrespective of the treatment and fashioning to which the continuous sheets are subjected before their registration and irrespective of the means of assembly of the upper and lower sheets (gluing, fusing and thermobonding by heated cylinders or by passage in an oven or by any other heating means etc.). Furthermore, modifications can be made to the mechanical means utilized for carrying out the process without departing from the scope of the invention.

What is claimed is:

1. A process for forming a continuous assembly of sealed envelopes having upper and lower sections and comprising at least one insert of the type used as a postal mailer or the like comprising the steps of:

(a) providing continuous upper and lower sheets each comprising transverse weakening lines defining said upper and lower sections adapted to be separated along each of said lines, consecutive weakening lines being separated by a substantially constant spacing E1;

(b) providing a continuous intermediate sheet comprising transverse weakening lines defining intermediate discrete sheet sections having a width less than the width of said upper and lower sections, consecutive weakening lines being spaced by a substantially constant spacing E2, E2 being less than E1;

(c) passing said upper and lower continuous sheets along discrete paths and through driver rollers at the inlet of a sealing station at a velocity V1 equal to the tangential speed of said drive rollers and passing said continuous intermediate sheet along a path and toward said driver rollers at a velocity V2 less than V1 wherein V2/V1 substantially equals E2/E1;

(d) progressively separating said continuous intermediate sheet to form discrete intermediate sheet sections along each of the weakening lines of said continuous intermediate sheet during passage through a separation station positioned ahead of said drive rollers whereby each of said intermediate sheet sections is positioned between said upper and lower continuous sheets to form said continuous assembly as it enters said drive rollers;

(e) passing said continuous assembly through said sealing station at an average velocity V1 to seal said upper and lower continuous sheets to form said sealed assembly; and (f) said step of progressively separating said continuous intermediate sheet comprising first subjecting each of said intermediate sheets to a forceful acceleration at a distance E2 ahead of said driver rollers thereby increasing its velocity to a velocity V3, V3 being substantially greater than V2 so as to achieve a clean separation of successive intermediate sheet sections by ripping them off along the weakening lines on said intermediate continuous sheet and subsequently substantially reducing the velocity of said intermediate sheet section to said average velocity V1 prior to entering said drive rollers.

2. The process as defined by claim 1 comprising sealing the longitudinal and transverse edges adjacent to said weakening lines of each of said sections by passing said upper and lower continuous sheets through pressure rollers.

3. The process as defined by claim 1 comprising incising said continuous intermediate sheet along a weakening line of said continuous intermediate sheet at a distance ahead of said drive rollers equal to between about E2 and 2E2.

4. The process as defined by claim 3 further comprising subjecting the intermediate sheet section being separated to an instantaneous acceleration no earlier than the formation of said incision.

5. The process as defined by claim 4 comprising instantaneously accelerating each of said intermediate sheet sections to effect separation thereof by means of an elliptical roller.

6. The process as defined by claim 1 comprising separating said intermediate sheet section from said continuous intermediate sheet by cutting said section and wherein the instant at which said intermediate section is separated from said intermediate sheet coincides with the takeup of the other end of said intermediate section by said drive rollers, said takeup occuring at said velocity V1.

7. The process as defined by claim 1 comprising accelerating each of said intermediate sheet sections to a velocity V3 to effect separation by means of a roller having a tangential velocity of V3, and reducing the velocity of said intermediate sheet sections to V1 by means of a reduction roller having a tangential velocity V1.

8. The process of claim 1 wherein said upper and lower continuous sheets are sealed without said insert being sealed to said upper and lower continuous sheets.

9. The process as defined by claim 3 wherein said said continuous intermediate sheet is incised along said weakening line of said continuous intermediate sheet occurs at any location ahead of said drive rollers and equal to between about E2 and 2E2.

10. An apparatus for forming a continuous sealed assembly of mailers or other postal assemblies out of continuous upper, lower, intermediate sheets, each of said sheets comprising longitudinal perforations along its lateral edges adapted to cooperate with feeder means for guiding each of said continuous sheets along respective paths and transverse weakening lines, said transverse weakening lines on said upper sheets being equidistantly spaced with respect to each other to define upper sheet sections, said transverse weakening lines on said intermediate sheet being equidistantly spaced with respect to each other to define intermediate sheet sections, and said transverse weakening lines on said lower sheet being equidistantly spaced with respect to each other to define lower sheet sections, said apparatus comprising:

(a) sealing means for sealing said upper and lower sheets so as to enclose said at least one intermediate sheet action within said upper and lower sheets; said sealing means further comprising drive rollers positioned at the inlet of said sealing means, said drive rollers being adapted to feed said upper and lower continuous sheets and at least one intermediate sheet section through said sealing means;

(b) first feeder means for moving said upper continous sheet along its path toward said drive rollers at a velocity V1;

(c) second feeder means for moving said intermediate continuous sheet along its path toward said drive rollers;

(d) third feeder means for moving said lower continous sheet along its path toward said drive rollers at a velocity V1;

(e) means adapted to control the speed of said feeder means whereby said second feeder means moves said intermediate continuous sheet toward said drive rollers at a velocity slower than each of said upper and lower continuous sheets, the relative velocities of movement of said upper, lower and intermediate sheets as they approach said drive rollers being proportional to the relative spacings of said weakening lines on each said of upper, lower and intermediate continuous sheets;

(f) separation means for successively separating intermediate sheet sections from said intermediate continuous sheet, said separation means being positioned ahead of said drive rollers and, wherein said separation means comprises cutting means adapted to at least initiate separation of said intermediate sheet sections from said intermediate continuous sheet along said weakening lines, said cutting means being positioned ahead of said drive rollers at a distance equal to about between one and two times the distance between successive transverse weakening lines on said intermediate continuous sheet, and wherein said separation means further comprises an accelerator positioned between said drive roller and said cutting means for intermittently instantaneously increasing the velocity of an intermediate sheet section which has been partially severed by said cutting means, said accelerator being adapted to operate synchronously with said cutting means and wherein said accelerator comprises an elliptical roller; and (g) means for feeding each of said discrete intermediate sheet sections from said separation means to said drive rollers between said upper and lower continuous sheets such that the average velocity between the instant of separation and that of entry into the drive rollers is substantially equal to the velocity V1 of said upper and lower continuous sheets.

11. The apparatus as defined by claim 10 wherein said first, second and third feeder means each comprise pin feeders adapted to cooperate with said marginal perforations, and the pin feeder of said second feeder means rotates more slowly than the pin feeders of said first and third feeder means.

12. The apparatus as defined by claim 10 further comprising an edge cutter for severing said perforated margins from said intermediate continuous sheet, said edge cutter being positioned ahead of said drive rollers and towards the end of the path leading to said drive rollers.

13. The apparatus as defined by claim 10 wherein said separation means comprises a rotating means whose tangential velocity is equal to twice the velocity of said intermediate continuous sheet upstream of said separation means and said rotating means is positioned whereby the instant of complete separation of said intermediate sheet section is substantially simultaneous with the entry of said separated intermediate sheet section between said upper and lower continuous sheets.

14. The apparatus as defined by claim 10 wherein said separation means separates each of said intermediate sheet sections from said continuous intermediate sheet and further comprises a rupture means for suddenly accelerating each of said intermediate sheet sections whereby said sections leave said separation means at a velocity greater than V1.

15. The apparatus as defined by claim 14 wherein said separation means comprises a pair of rollers for accelerating each of said intermediate sheet sections.

16. The apparatus as defined by claim 15 wherein said separation means further comprises at least one pair of reduction rollers positioned after said rupture means whose speed of rotation is adapted to be automatically regulated by sensing means positioned downstream of said reduction rollers, said sensing means being adapted to sense the presence of said intermediate sections and to signal said reduction rollers accordingly whereby the average velocity between the separation of said intermediate section and its entrance into the drive rollers is brought to be substantially equal to V1.

17. Apparatus of claim 10, wherein said sealing means comprise means for sealing said upper and lower continuous sheets without said intermediate sheet being sealed to said upper and lower sheets.

18. The apparatus of claim 12 wherein said second feeder is located below said intermediate sheet, and said edge cutter is positioned above said intermediate sheet.

* * * * *